US010956130B2

(12) United States Patent
Rizo et al.

(10) Patent No.: US 10,956,130 B2
(45) Date of Patent: Mar. 23, 2021

(54) METHOD AND SYSTEM FOR IMPLEMENTING A CLOUD INFRASTRUCTURE VISUALIZER AND GENERATOR

(71) Applicant: JPMorgan Chase Bank, N.A., New York, NY (US)

(72) Inventors: Roberto C. Rizo, Berwyn, IL (US); Hassan B. Jiwani, Aurora, IL (US)

(73) Assignee: JPMorgan Chase Bank, N.A., New York, NY (US)

( * ) Notice: Subject to any disclaimer, the term of this patent is extended or adjusted under 35 U.S.C. 154(b) by 18 days.

(21) Appl. No.: 16/502,325

(22) Filed: Jul. 3, 2019

(65) Prior Publication Data
US 2020/0012480 A1    Jan. 9, 2020

Related U.S. Application Data

(60) Provisional application No. 62/694,143, filed on Jul. 5, 2018.

(51) Int. Cl.
| | | |
|---|---|---|
| G06F 9/44 | (2018.01) | |
| G06F 8/35 | (2018.01) | |
| G06F 21/57 | (2013.01) | |
| G06F 8/71 | (2018.01) | |
| H04L 29/08 | (2006.01) | |

(52) U.S. Cl.
CPC ............. *G06F 8/35* (2013.01); *G06F 8/71* (2013.01); *G06F 21/577* (2013.01); *H04L 67/10* (2013.01)

(58) Field of Classification Search
CPC . G06F 8/35; G06F 8/71; G06F 21/577; H04L 67/10

USPC ................................................ 717/105–120
See application file for complete search history.

(56) References Cited

U.S. PATENT DOCUMENTS

| | | | | |
|---|---|---|---|---|
| 5,499,371 A * | 3/1996 | Henninger | ................ | G06F 8/24 717/108 |
| 5,974,256 A * | 10/1999 | Matthews | ................ | G06F 8/41 717/118 |
| 6,088,717 A * | 7/2000 | Reed | ....................... | H04L 29/06 707/999.01 |
| 6,851,107 B1 * | 2/2005 | Coad | ........................ | G06F 8/20 717/108 |
| 6,968,184 B2 * | 11/2005 | Criss | ....................... | H04B 1/38 455/418 |

(Continued)

OTHER PUBLICATIONS

Juracz et al, "Architectural Framework for Generic Modeling and Diagramming in the Cloud", International Journal of Digital Information and Wireless Communications, pp. 455-465 (Year: 2011).*

(Continued)

*Primary Examiner* — Anil Khatri
(74) *Attorney, Agent, or Firm* — Hunton Andrews Kurth LLP

(57) ABSTRACT

An embodiment of the present invention is directed to providing a cloud infrastructure visualizer and generator. The innovative system may use an Infrastructure Diagramming Tool to create Infrastructure Design Diagrams (IDD) to allow System Engineers to design the Infrastructure to meet various application needs. From the Infrastructure Diagramming Tool, a user may initiate code generation that may then be easily deployable to a cloud platform.

18 Claims, 6 Drawing Sheets

(56) References Cited

U.S. PATENT DOCUMENTS

| | | | | |
|---|---|---|---|---|
| 6,993,759 B2* | 1/2006 | Aptus | ................ | G06F 8/20 |
| | | | | 715/202 |
| 7,055,131 B2* | 5/2006 | Charisius | ............ | G06F 8/20 |
| | | | | 345/619 |
| 7,178,166 B1* | 2/2007 | Taylor | ............ | G06F 21/577 |
| | | | | 709/228 |
| 7,240,325 B2* | 7/2007 | Keller | ............ | G06F 9/5061 |
| | | | | 717/104 |
| 7,685,159 B2* | 3/2010 | Mitchell | ............ | G06F 16/34 |
| | | | | 707/726 |
| 8,001,519 B2* | 8/2011 | Conallen | ............ | G06F 8/316 |
| | | | | 717/105 |
| 8,683,584 B1* | 3/2014 | Daswani | ............ | G06F 21/62 |
| | | | | 726/22 |
| 8,826,224 B2* | 9/2014 | Nerome | ............ | G06F 8/35 |
| | | | | 717/104 |
| 9,064,134 B1* | 6/2015 | Agarwal | ............ | G06F 21/70 |
| 10,223,099 B2* | 3/2019 | Avant | ................ | G06F 8/71 |
| 10,503,908 B1* | 12/2019 | Bellis | ............ | G06F 16/9032 |
| 10,691,810 B1* | 6/2020 | Freitag | ............ | G06F 21/577 |
| 10,698,668 B1* | 6/2020 | Pohlack | ............ | G06F 8/44 |
| 2006/0037000 A1* | 2/2006 | Speeter | ............ | H04L 67/10 |
| | | | | 717/120 |

OTHER PUBLICATIONS

Maayan et al, "How Domain Experts Create Conceptual Diagrams and Implications for Tool Design", ACM, pp. 1-14 (Year: 2020).*

Cao et al, "Generating Web-based User Interfaces for Diagramming Tools", ACM, pp. 1-10 (Year: 2005).*

Fischer et al, "Populating a Release History Database from Version Control and Bug Tracking Systems", IEEE, pp. 1-10 (Year: 2003).*

Plaice et al, "A New Approach to Version Control", IEEE, pp. 268-276 (Year: 1993).*

Hata et al, "Historage: Fine-grained Version Control System for Java", ACM, pp. 96-100 (Year: 2011).*

Draheim et al, "Process-Centric Analytical Processing of Version Control Data", IEEE, pp. 1-6 (Year: 2002).*

Oda et al, "Generative Technique of Version Control Systems for Software Diagrams", IEEE, pp. 1-10 (Year: 2005).*

* cited by examiner

METHOD AND SYSTEM FOR IMPLEMENTING A CLOUD INFRASTRUCTURE VISUALIZER AND GENERATOR

CROSS REFERENCE TO RELATED APPLICATIONS

The application claims priority to U.S. Provisional Application 62/694,143, filed Jul. 5, 2018, the contents of which are incorporated herein in its entirety.

FIELD OF THE INVENTION

The invention relates generally to a method and system for implementing a cloud infrastructure visualizer and generator.

BACKGROUND OF THE INVENTION

Creating an infrastructure and reproducing a similar lower level environment for testing requires system engineers to learn a new coding language, export the cloud providers script to reproduce and re-run in a new environment, or manually re-create it. Moreover, it is difficult to determine infrastructure security without getting other teams involved.

These and other drawbacks exist.

SUMMARY OF THE INVENTION

According to one embodiment, the invention relates to a system that implements an infrastructure visualizer and generator. The system comprises: a version control repository that stores infrastructure code; an interface that receives an input from an infrastructure diagramming tool; and a computer processor, coupled to the version control repository, programmed to perform the steps of: receiving, via the interface, a diagram file from the infrastructure diagramming tool, wherein the diagram file is specific to a platform; initiating a script to read the diagram file to identify objects and corresponding labels; generating code, based on the objects and labels, from the diagram file; and creating deploy-ready code for execution on the platform.

The system may include a specially programmed computer system comprising one or more computer processors, interactive interfaces, electronic storage devices, and networks.

According to another embodiment, the invention relates to a method that implements an infrastructure visualizer and generator. The method comprises the steps of: receiving, via the interface, a diagram file from an infrastructure diagramming tool, wherein the diagram file is specific to a platform; initiating a script to read the diagram file to identify objects and corresponding labels; generating code, based on the objects and labels, from the diagram file; and creating deploy-ready code for execution on the platform.

The computer implemented system, method and medium described herein provide unique advantages to entities, organizations and other users, according to various embodiments of the invention. The innovative Infrastructure Visualizer and Generator provides a self-service tool that creates code to build, modify and deploy. The tool may be cloud agnostic and work with various cloud providers, physical servers and other architectures and providers. These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION OF THE PREFERRED EMBODIMENT(S)

Figure 1:
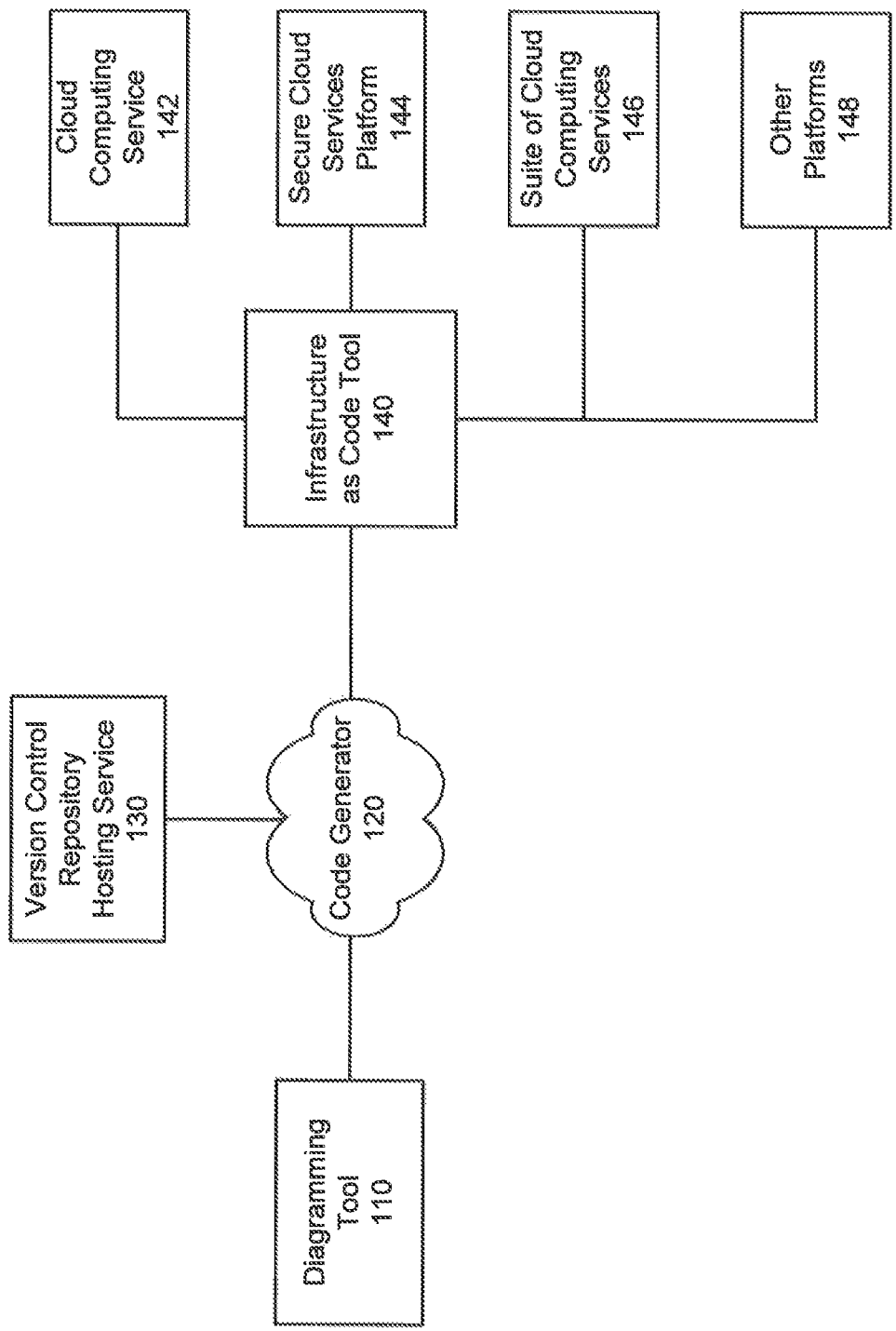
FIG. 1 is an exemplary illustration of an infrastructure visualizer and generator workflow, according to an embodiment of the present invention.

The following description is intended to convey an understanding of the present invention by providing specific embodiments and details. It is understood, however, that the present invention is not limited to these specific embodiments and details, which are exemplary only. It is further understood that one possessing ordinary skill in the art, in light of known systems and methods, would appreciate the use of the invention for its intended purposes and benefits in any number of alternative embodiments, depending upon specific design and other needs.

An embodiment of the present invention is directed to providing a cloud infrastructure visualizer and generator system. The innovative system uses an Infrastructure Diagraming Tool to create Infrastructure Design Diagrams (IDD) that allow System Engineers to design a secure infrastructure to meet various application needs. From the Infrastructure Diagramming Tool, a user may initiate code generation that may then be easily deployable to various cloud platforms, such as AWS®, GCP® and AZURE®. With the infrastructure in code form, it may be versioned controlled in a Source Code Repository for others to reuse and/or compared to prior iterations and/or other environments. The code may then be used to facilitate the ability to run against best practices. According to an exemplary implementation, the system may incorporate various components and solutions to generate a diagram; to read the diagram; and to generate the cloud infrastructure code. Other components, solutions and variations may be applied and/or implemented.

An exemplary workflow may include providing a diagram file and a task automation and configuration management framework (e.g., Diagramming Tool, etc.) that a System Engineer may download from a repository or other source. The System Engineer may then use a template to create a new file with a layout. The template may be specific to a particular platform, e.g., cloud platform, etc. Once done, the file may contain an interactive icon (or other interface) that may execute a script to generate a TerraForm script. An embodiment of the present invention may then initiate a build of a best practices system that may scan the layout for known vulnerabilities and/or recommended enhancements.

Terraform script may represent an infrastructure as code software. It allows users to define a datacenter infrastructure in a high-level configuration language, from which it can create an execution plan to build the infrastructure. Terraform is one example, other tools for building, changing and/or versioning infrastructure may be used.

When the layout is done, the script may then be shared with a cloud team to deploy and stand-up the environment. Stand-up the environment generally refers to building out the infrastructure, including servers, etc. For example, a cloud agnostic code generator may scan and compare the infrastructure to a code base to check for unauthorized changes and/or differences between different environments. This may be used by any entity seeking to build on Infrastructure-As-Code (IaC). An embodiment of the present invention may allow users and teams, such as DevOpsArch (development, operations and Infrastructure architecture) teams, to more easily maintain a build process of the architecture and application software deployment.

FIG. 1 is an exemplary illustration of an infrastructure visualizer and generator workflow, according to an embodiment of the present invention. As shown in FIG. 1, diagram files may be generated and transmitted from Diagramming Tool 110. Code Generator 120 may generate code based on the diagram files and further store the code in a source code repository provided by Version Control Repository Hosting Service 130. Infrastructure-as-Code Tool 140 may then deploy the code on various cloud computing platforms, such as Cloud Computing Service 142, Secure Cloud Services Platform 144, Suite of Cloud Computing Services 146 and other platforms represented by 148. Other platforms may include physical servers, virtual servers, etc.

Diagramming Tool 110 may enable a user, such as a solution or system architect, to create an infrastructure diagram. This may include using a specific stencil, template and/or other diagram resource. For example, the stencil may include a set of predefined fields or questions to interact with the user. The predefined fields may include server name, type of server, size of server, type of memory, size of memory, disk space, etc. In addition, the infrastructure diagram may include other resources, such as a global load balancer, corresponding availability zones, application server, web server, application layer, web layer, database payer and/or other components of an environment. An embodiment of the present invention may also provide recommendations, suggestions and/or guidelines for optimal performance or other result. For example, an embodiment of the present invention may provide recommendations to realize efficiencies and/or other benefits based on predefined parameters and/or other considerations. If cost is a factor, an embodiment of the present invention may suggest deployment on a cloud service that realizes an optimal set of efficiencies (e.g., most cost effective option, etc.).

DevOps (development and operations) generally refers to a type of agile relationship between development and IT Operations; a synergy between developers and operations team to continue code development and continuous code deployment. Missing from DevOps is the role of infrastructure architecture. An embodiment of the present invention is directed to modifying the role to now be a DevOpsArch (development, operations and Infrastructure architecture) team that continues development, continues code deployment and continues infrastructure design.

An embodiment of the present invention is directed to a continuous infrastructure design and deployment of new or updated infrastructure along with developers who are developing software throughout an entire lifecycle and to further treat various aspects of operations as software even those that represent hardware.

According to an embodiment of the present invention, an Infrastructure Visualizer and Generator represents a self-service tool that takes an Architectural Design created in a diagramming or drawing tool and then generates the code to build, modify and/or destroy (e.g., deleting) the infrastructure in the Cloud. An embodiment of the present invention may be Cloud agnostic and work with various Cloud providers, services and platforms.

The embodiments of the present invention provides various benefits. For example, the system may be agent-less. This means that an agent does not need to be installed on a client or server side. The software may be executed to build the environment. The system may provide increased speed and efficiency. For example, standing-up the infrastructure via code will be significantly faster than a person logging on to create the infrastructure. The system promotes safety where an automation process ensures improved consistency and reliability by reducing manual error. An embodiment of the present invention provides code validation to review the code before building the environment. The system also provides version control where IaC (Infrastructure-as-Code) source files may be stored in version control and the history of the infrastructure may be reviewed in a commit log or other output. This further allows users to review infrastructure changes. The system further facilitates building a best practice engine that scans the code for an initial design and identifies potential risks and/or design that do not meet firm standards.

Figure 2:
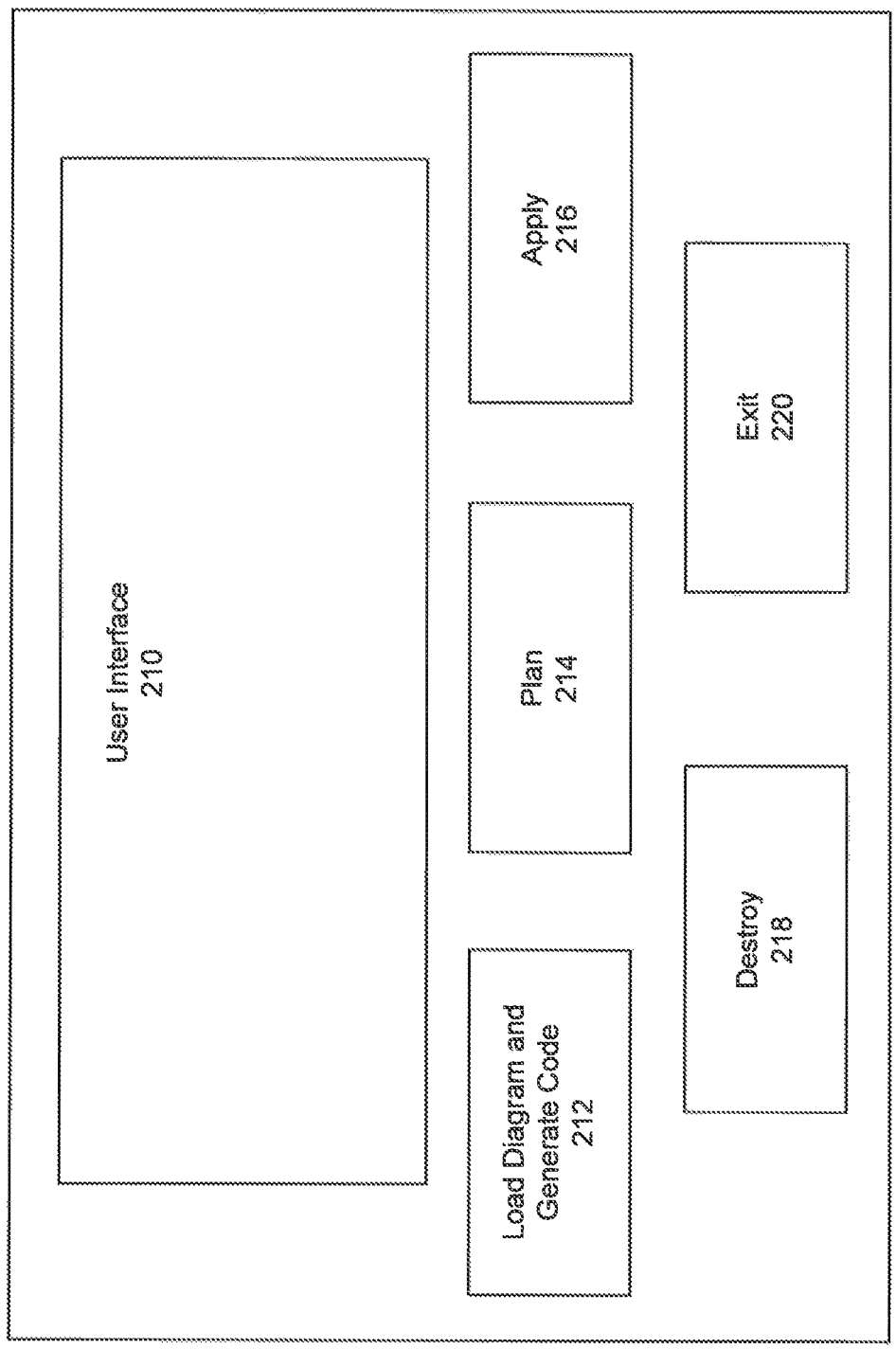
FIG. 2 is an exemplary system diagram of an interactive user interface for an infrastructure visualizer and generator, according to an embodiment of the present invention.

FIG. 2 is an exemplary system diagram of an interactive user interface for an infrastructure visualizer and generator, according to an embodiment of the present invention. As shown in FIG. 2, User Interface 210 may interact with modules and commands including Load Diagram and Generate Code 212, Plan 214, Apply 216, Destroy 218 and Exit 220. For example, Load Diagram and Generate Code 212 enables a user to select the drawing file and once selected, the system generates the corresponding code, e.g., Terraform code. Plan 214 may display changes that will be applied to the environment such as addition and deletion of the infrastructure. Apply 216 represents a function to execute Terraform code to build out the infrastructure. Destroy 218 may provide deleting the infrastructure that was built by the code. Exit 220 may enable a user to the program.

Figure 3:
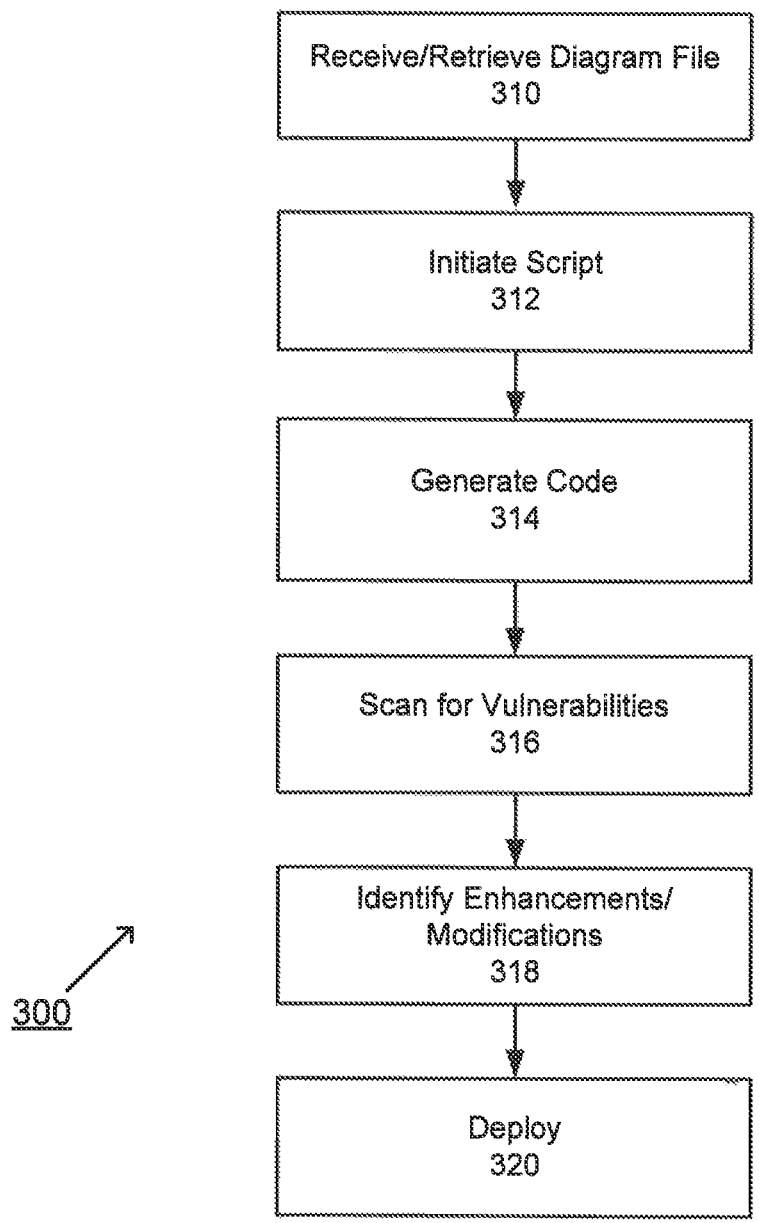
FIG. 3 is an exemplary flowchart of a method for implementing an infrastructure visualizer and generator system, according to an embodiment of the present invention.

FIG. 3 is an exemplary flowchart of a method for implementing an infrastructure visualizer and generator system, according to an embodiment of the present invention. At step 310, a diagram file may be received or retrieved from an infrastructure diagramming tool or other source. At step 312, a script may be initiated. The script may include a custom script that reads the diagram file. At step 314, code may be generated from the script. The code may represent infrastructure code. For example, Terraform code may be generated. Terraform is one example; other scripts and code may be applied and generated. At step 316, the system may scan the infrastructure code for vulnerabilities as well as best practices. For example, an embodiment of the present invention may confirm that minimum requirements are met for security protocols. Other validation and confirmation processes may be implemented. At step 318, enhancement and/or modifications may be identified. For example, other guardrail may be added; this may include what operating system (OS) can be installed or who has access to server, etc. At step 320, the code may be deployed on a cloud service.

The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed.

Figure 4:
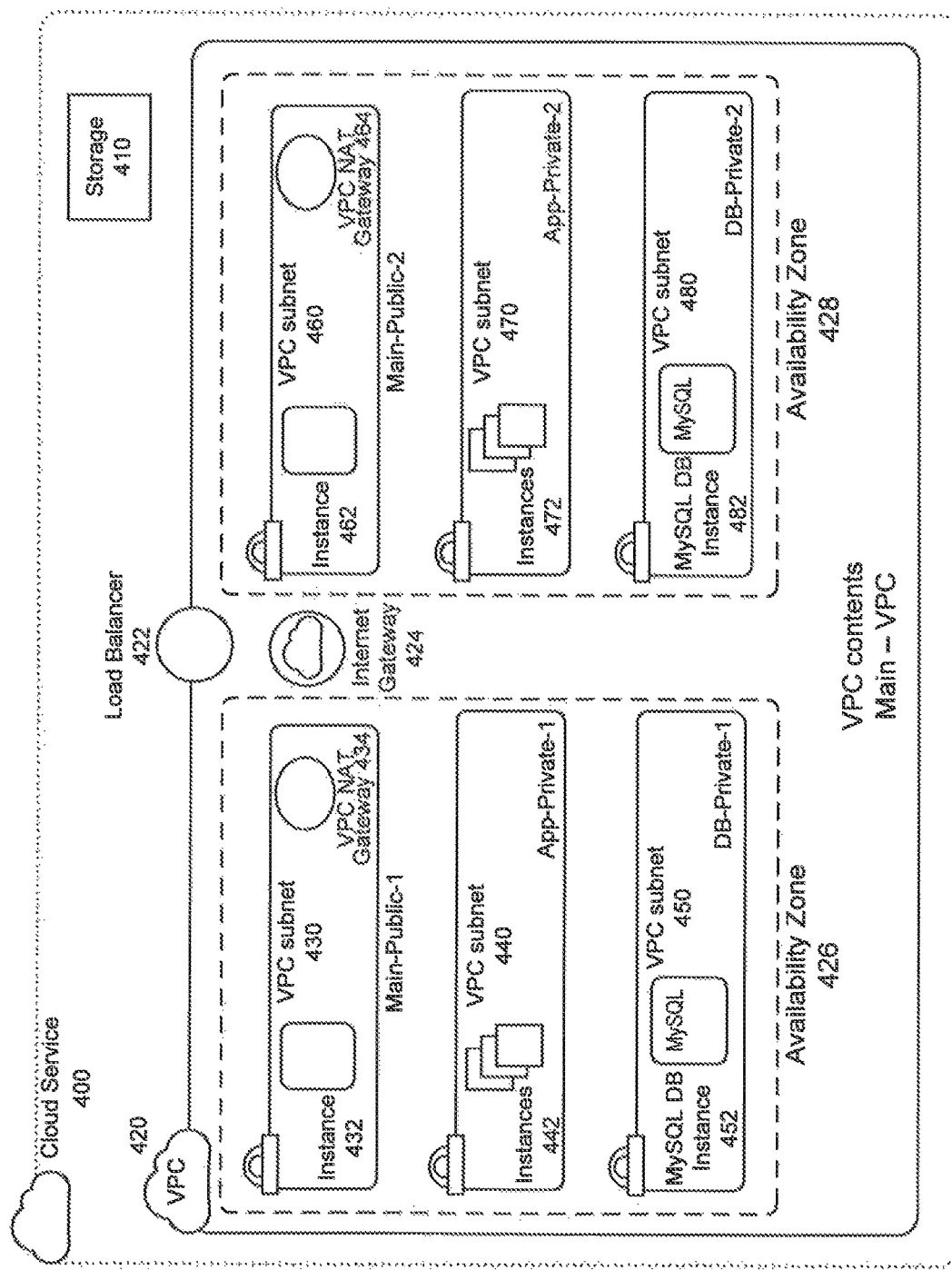
FIG. 4 is an exemplary illustration of an infrastructure visualizer and generator implementation, according to an embodiment of the present invention.

FIG. 4 is an exemplary illustration of an infrastructure visualizer and generator implementation, according to an embodiment of the present invention. FIG. 4 illustrates an exemplary architecture diagram. Other architecture and deployments may be realized. As shown in FIG. 4, Cloud Service 400 includes Storage 410 and Virtual Private Cloud (VPC) 420. VPC 420 represents an on-demand configurable pool of shared computing resources allocated within a public cloud environment. In this example, VPC 420 comprises a Load Balancer 422, Internet Gateway 424, Availability Zone 426 and Availability Zone 428. As shown in FIG. 4, Availability Zones 426 and 428 each include a set of VPC subnets. VPC Subnet 430 represents a Main Public 1 and includes Instance 432 and Gateway 434. VPC Subnet 440 represents a Private Application and includes Instances 442. VPC Subnet 450 represents a Private Database and includes MySQL DB Instance 452. VPC Subnet 460 represents a Main Public 2 and includes Instance 462 and Gateway 464. VPC Subnet 470 represents a Private Application and includes Instances 472. VPC Subnet 480 represents a Private Database and includes MySQL DB Instance 482. The diagram of FIG. 4 may be created using a drag and drop actions. Other inputs and user interactions may be supported.

FIG. 4 illustrates an exemplary architecture diagram for a specific cloud service provider. For another cloud service provider, a different set of components may be available. In addition, other platforms may implemented including physical servers, virtual servers, etc. An embodiment of the present invention may be applied to integrated platforms, such as Integrated Compute Platforms (ICP). ICP represents a platform that may include different applications and services. An embodiment of the present invention may be applied to a diagram specific to a platform or service where a diagram is read and a corresponding script may be generated.

Figure 5:
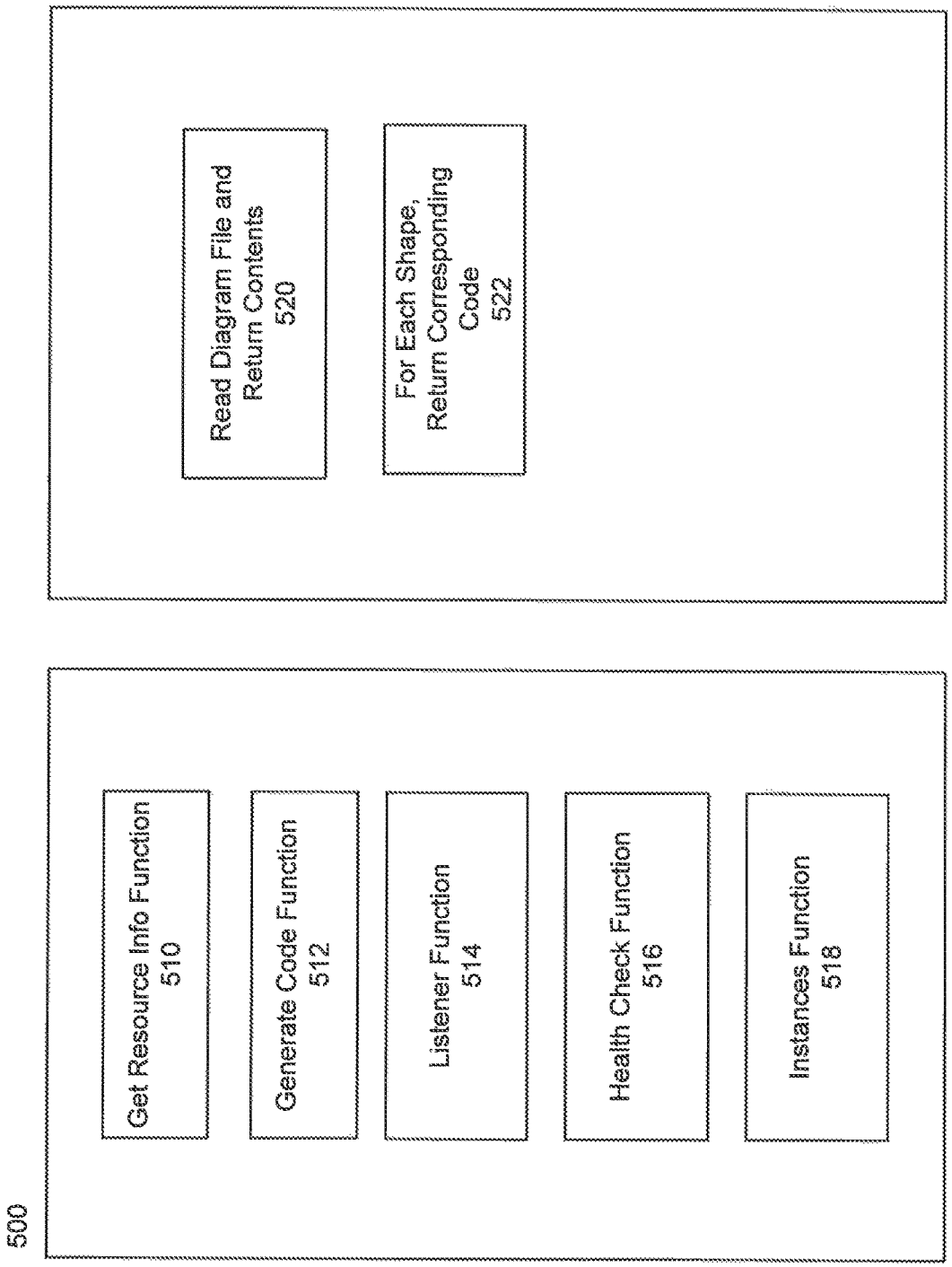
FIG. 5 is exemplary code from a Diagramming Tool, according to an embodiment of the present invention.

FIG. 5 is exemplary code from a Diagramming Tool, according to an embodiment of the present invention. 500 represents code that may be applied to an architecture diagram, such as the one illustrated in FIG. 4. An embodiment of the present invention may scan a diagram and identify objects. Based on the objects, an embodiment of the present invention may read corresponding labels to then ensure that the required fields have been provided and then generate code to stand up the infrastructure. In this example, 500 includes various functions, including Get Resource Information Function 510, Generate Code Function 512, Listener Function 514, Health Check Function 516, Instances Function 518, Read Diagram File and Return Contents 520. For each shape, a corresponding code may be returned, as represented by 522. Code 500 may be applied to read a diagram file and return the corresponding contents.

Figure 6:
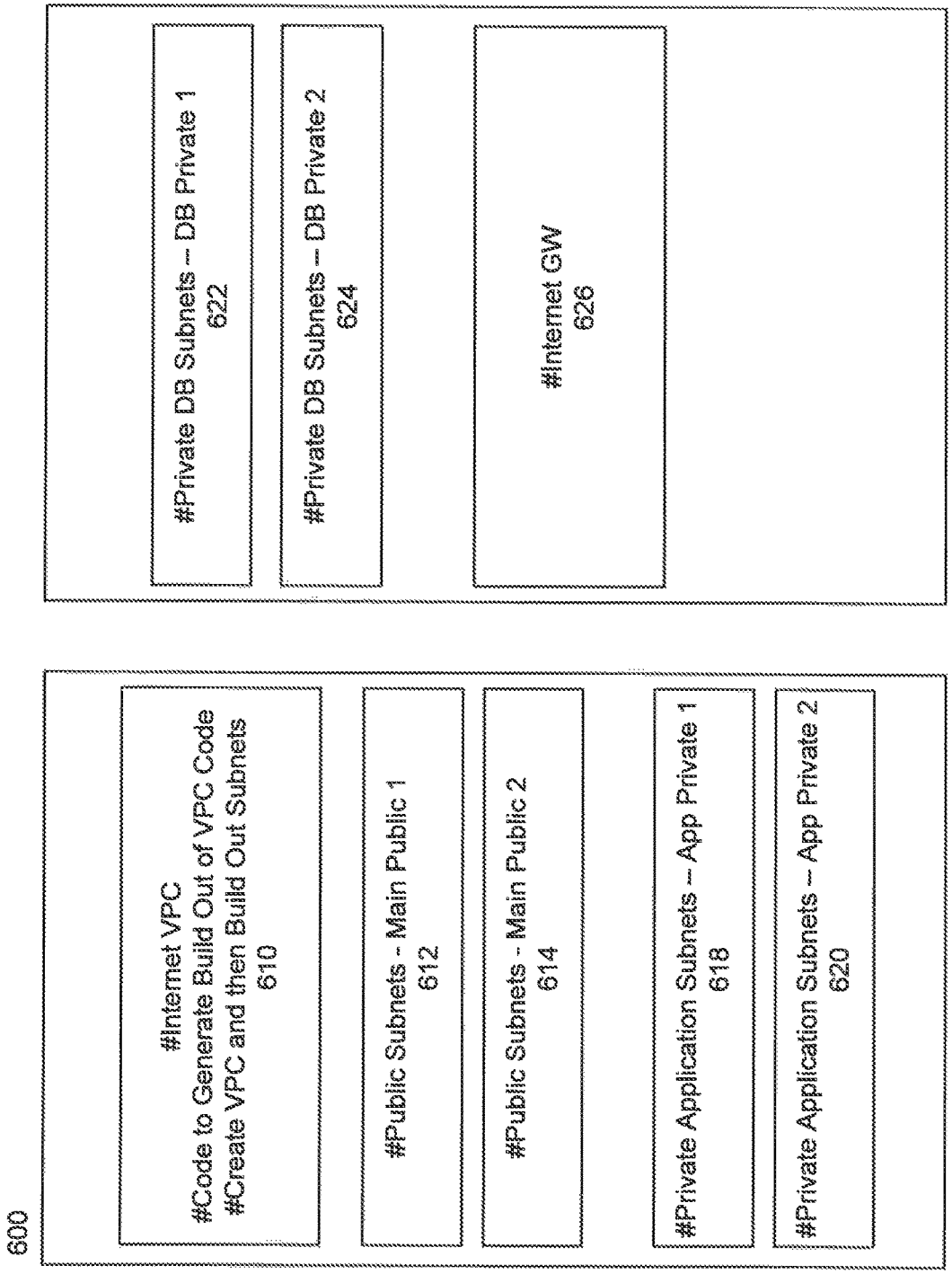
FIG. 6 is exemplary code for cloud deployment, according to an embodiment of the present invention.

FIG. 6 is exemplary code for cloud deployment, according to an embodiment of the present invention. FIG. 6 illustrates exemplary code 600 to generate the architecture illustrated in a diagram, such as the one illustrated in FIG. 4. Code 600 may represent Terraform code. Other types of code may be generated. As shown in FIG. 6, 610 may represent code instructions or comments. 612 represents code corresponding to VPC subnet illustrated by 430 in FIG. 4. 614 represents code corresponding to VPC subnet illustrated by 460. 618 represents code corresponding to VPC subnet illustrated by 440. 620 represents code corresponding to VPC subnet illustrated by 470. 622 represents code corresponding to VPC subnet illustrated by 450. 624 represents code corresponding to VPC subnet illustrated by 480. 626 represents code corresponding to Internet Gateway illustrated by 424.

The foregoing examples show the various embodiments of the invention in one physical configuration; however, it is to be appreciated that the various components may be located at distant portions of a distributed network, such as a local area network, a wide area network, a telecommunications network, an intranet and/or the Internet. Thus, it should be appreciated that the components of the various embodiments may be combined into one or more devices, collocated on a particular node of a distributed network, or distributed at various locations in a network, for example. As will be appreciated by those skilled in the art, the components of the various embodiments may be arranged at any location or locations within a distributed network without affecting the operation of the respective system.

As described above, the various embodiments of the present invention support a number of communication devices and components, each of which may include at least one programmed processor and at least one memory or storage device. The memory may store a set of instructions. The instructions may be either permanently or temporarily stored in the memory or memories of the processor. The set of instructions may include various instructions that perform a particular task or tasks, such as those tasks described above. Such a set of instructions for performing a particular task may be characterized as a program, software program, software application, app, or software.

It is appreciated that in order to practice the methods of the embodiments as described above, it is not necessary that the processors and/or the memories be physically located in the same geographical place. That is, each of the processors and the memories used in exemplary embodiments of the invention may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two or more pieces of equipment in two or more different physical locations. The two distinct pieces of equipment may be connected in any suitable manner. Additionally, the memory may include two or more portions of memory in two or more physical locations.

As described above, a set of instructions is used in the processing of various embodiments of the invention. The servers may include software or computer programs stored in the memory (e.g., non-transitory computer readable medium containing program code instructions executed by the processor) for executing the methods described herein. The set of instructions may be in the form of a program or software or app. The software may be in the form of system software or application software, for example. The software might also be in the form of a collection of separate programs, a program module within a larger program, or a portion of a program module, for example. The software used might also include modular programming in the form of object oriented programming. The software tells the processor what to do with the data being processed.

Further, it is appreciated that the instructions or set of instructions used in the implementation and operation of the invention may be in a suitable form such that the processor may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processor, i.e., to a particular type of computer, for example. Any suitable programming language may be used in accordance with the various embodiments of the invention. For example, the programming language used may include assembly language, Ada, APL, Basic, C, C++, COBOL, DBASE®, Forth, Fortran, JAVA®, Modula-2, Pascal, PROLOG®, REXX, VISUAL BASIC®, JAVASCRIPT® and/or PYTHON®. Further, it is not necessary that a single type of instructions or single programming language be utilized in conjunction with the operation of the system and method of the invention. Rather, any number of different programming languages may be utilized as is necessary or desirable.

Also, the instructions and/or data used in the practice of various embodiments of the invention may utilize any compression or encryption technique or algorithm, as may be desired. An encryption module might be used to encrypt data. Further, files or other data may be decrypted using a suitable decryption module, for example.

In the system and method of exemplary embodiments of the invention, a variety of "user interfaces" may be utilized to allow a user to interface with the mobile devices or other personal computing device. As used herein, a user interface may include any hardware, software, or combination of hardware and software used by the processor that allows a user to interact with the processor of the communication device. A user interface may be in the form of a dialogue screen provided by an app, for example. A user interface may also include any of touch screen, keyboard, voice reader, voice recognizer, dialogue screen, menu box, list, checkbox, toggle switch, a pushbutton, a virtual environment (e.g., Virtual Machine (VM)/cloud), or any other device that allows a user to receive information regarding the operation of the processor as it processes a set of instructions and/or provide the processor with information. Accordingly, the user interface may be any system that provides communication between a user and a processor. The information provided by the user to the processor through the user interface may be in the form of a command, a selection of data, or some other input, for example.

The software, hardware and services described herein may be provided utilizing one or more cloud service models, such as Software-as-a-Service (SaaS), Platform-as-a-Service (PaaS), and Infrastructure-as-a-Service (IaaS), and/or using one or more deployment models such as public cloud, private cloud, hybrid cloud, and/or community cloud models.

Although the embodiments of the present invention have been described herein in the context of a particular implementation in a particular environment for a particular purpose, those skilled in the art will recognize that its usefulness is not limited thereto and that the embodiments of the present invention can be beneficially implemented in other related environments for similar purposes.

What is claimed is:

1. A system that implements an infrastructure visualizer and generator, the system comprises:
    a version control repository that stores infrastructure code;
    an interface that receives an input from an infrastructure diagramming tool; and
    a computer processor, coupled to the version control repository, programmed to perform the steps of:
    receiving, via the interface, a diagram file from the infrastructure diagramming tool, wherein the diagram file is specific to a platform;
    initiating a script to read the diagram file to identify objects and corresponding labels;
    generating code, based on the objects and labels, from the diagram file;
    scanning the code for known vulnerabilities and implementation of a set of best practices;
    identifying and applying one or more enhancements and modifications for the code including identification of the operating systems that may be installed and identification of one or more user credentials; and
    creating deploy-ready code for execution on the platform.

2. The system of claim 1, wherein the computer processor is programmed to perform the step of:
    scanning the code for vulnerabilities.

3. The system of claim 1, wherein the platform comprises a cloud platform.

4. The system of claim 1, wherein the platform comprises physical server platform.

5. The system of claim 1, wherein the platform comprises integrated compute platform (ICP).

6. The system of claim 1, wherein the deploy-ready code is automatically executed on the platform.

7. The system of claim 1, wherein the code comprises Terraform code.

8. The system of claim 1, wherein the infrastructure visualizer and generator is cloud agnostic.

9. The system of claim 1, wherein the user interface comprises a Load Diagram and Generate Code function, a Plan function, an Apply function and an Apply function.

10. A method that implements an infrastructure visualizer and generator, the method comprises the steps of:
    receiving, via the interface, a diagram file from an infrastructure diagramming tool, wherein the diagram file is specific to a platform;
    initiating a script to read the diagram file to identify objects and corresponding labels;
    generating code, based on the objects and labels, from the diagram file;
    scanning the code for known vulnerabilities and implementation of a set of best practices;
    identifying and applying one or more enhancements and modifications for the code including identification of the operating systems that may be installed and identification of one or more user credentials; and
    creating deploy-ready code for execution on the platform.

11. The method of claim 10, further comprising the step of:
    scanning the code for vulnerabilities.

12. The method of claim 10, wherein the platform comprises a cloud platform.

13. The method of claim 10, wherein the platform comprises physical server platform.

14. The method of claim 10, wherein the platform comprises integrated compute platform (ICP).

15. The method of claim 10, wherein the deploy-ready code is automatically executed on the platform.

16. The method of claim 10, wherein the code comprises Terraform code.

17. The method of claim 10, wherein the infrastructure visualizer and generator is cloud agnostic.

18. The method of claim 10, wherein the user interface comprises a Load Diagram and Generate Code function, a Plan function, an Apply function and an Apply function.

* * * * *